(12) United States Patent  
Bae et al.

(10) Patent No.: US 10,481,446 B2
(45) Date of Patent: Nov. 19, 2019

(54) LIQUID CRYSTAL LENS PANEL AND METHOD OF MANUFACTURING DISPLAY DEVICE USING THE SAME

(71) Applicant: Samsung Display Co., LTD., Yongin, Gyeonggi-Do (KR)

(72) Inventors: Jihong Bae, Yongin-si (KR); Suk Choi, Seongnam-si (KR); Sujin Kim, Seoul (KR); Heungshik Park, Seoul (KR); Hyeokjin Lee, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 629 days.

(21) Appl. No.: 15/084,761

(22) Filed: Mar. 30, 2016

(65) Prior Publication Data

US 2016/0209689 A1  Jul. 21, 2016

Related U.S. Application Data

(62) Division of application No. 13/795,769, filed on Mar. 12, 2013.

(30) Foreign Application Priority Data

Nov. 21, 2012  (KR) .......................... 10-2012-0132470

(51) Int. Cl.
*G02F 1/1345* (2006.01)
*G02F 1/1343* (2006.01)
(Continued)

(52) U.S. Cl.
CPC .......... *G02F 1/1345* (2013.01); *G02F 1/1393* (2013.01); *G02F 1/13471* (2013.01);
(Continued)

(58) Field of Classification Search
CPC ............. G02F 1/1345; G02F 1/134309; G02F 1/13471; G02F 1/1393; G02F 1/29; G09G 3/3648; H04N 13/305; H04N 13/359
(Continued)

(56) References Cited

U.S. PATENT DOCUMENTS 7,034,785 B2  4/2006 Koma
7,199,855 B2  4/2007 Yoshimi et al.
(Continued)

FOREIGN PATENT DOCUMENTS

JP  2000194277 A  7/2000
JP  2006011212 A  1/2006
(Continued)

*Primary Examiner* — Michael N Orlando
*Assistant Examiner* — Elizabeth Bradford
(74) *Attorney, Agent, or Firm* — Cantor Colburn LLP

(57) ABSTRACT

A liquid crystal lens panel includes a first substrate including a lens area, a non-lens area disposed adjacent to the lens area, and a cutting area disposed adjacent to the non-lens area and including a liquid crystal driving part, a second substrate disposed opposite to the first substrate, and a liquid crystal layer interposed between the first substrate and the second substrate, where the liquid crystal driving part applies a liquid crystal driving voltage to the liquid crystal layer through the non-lens area, and liquid crystal molecules of the liquid crystal layer are driven substantially in a vertical direction by the liquid crystal driving voltage.

6 Claims, 11 Drawing Sheets

(51) Int. Cl.
  *G02F 1/1347* (2006.01)
  *G02F 1/139* (2006.01)
  *G02F 1/29* (2006.01)
  *G09G 3/36* (2006.01)
  *H04N 13/305* (2018.01)
  *H04N 13/359* (2018.01)

(52) U.S. Cl.
  CPC .......... *G02F 1/134309* (2013.01); *G02F 1/29* (2013.01); *G09G 3/3648* (2013.01); *H04N 13/305* (2018.05); *H04N 13/359* (2018.05); *G02F 2001/294* (2013.01); *G09G 2300/0426* (2013.01); *G09G 2300/0434* (2013.01); *Y10T 156/108* (2015.01)

(58) Field of Classification Search
  USPC ....................................................... 156/272.2
  See application file for complete search history.

(56) References Cited

U.S. PATENT DOCUMENTS

| | | | |
|---|---|---|---|
| 8,358,399 | B2 | 1/2013 | Lee et al. |
| 2001/0020988 | A1 | 9/2001 | Ohgiichi et al. |
| 2004/0240777 | A1 | 12/2004 | Woodgate et al. |
| 2006/0158511 | A1* | 7/2006 | Harrold ................. G02F 1/1333 348/51 |
| 2006/0176439 | A1* | 8/2006 | Tashiro ................. G02F 1/1303 349/190 |
| 2009/0015737 | A1 | 1/2009 | Jung et al. |
| 2009/0153653 | A1 | 6/2009 | Lee et al. |
| 2012/0120333 | A1 | 5/2012 | Chen et al. |
| 2012/0154556 | A1 | 6/2012 | An et al. |
| 2013/0100364 | A1* | 4/2013 | Hsiao ....................... G02F 1/29 349/15 |

FOREIGN PATENT DOCUMENTS

| | | |
|---|---|---|
| KR | 1020010087355 A | 9/2001 |
| KR | 100718560 B1 | 5/2007 |
| KR | 1020090004006 A | 1/2009 |
| KR | 1020090017049 A | 2/2009 |
| KR | 1020090040587 A | 4/2009 |
| KR | 1020090045842 A | 5/2009 |
| KR | 1020090048206 A | 5/2009 |
| KR | 1020090057804 A | 6/2009 |
| KR | 1020090063534 A | 6/2009 |
| KR | 1020100048819 A | 5/2010 |
| KR | 1020100123319 A | 11/2010 |
| KR | 1020120017308 A | 2/2012 |
| KR | 1020120028171 A | 3/2012 |
| KR | 1020130046116 A | 5/2013 |

* cited by examiner

LIQUID CRYSTAL LENS PANEL AND METHOD OF MANUFACTURING DISPLAY DEVICE USING THE SAME

CROSS REFERENCE TO RELATED APPLICATIONS

This patent application is a divisional of U.S. patent application Ser. No. 13/795,769, filed on Mar. 12, 2013, which claims priority to Korean Patent Application No. 10-2012-0132470, filed on Nov. 21, 2012, and all the benefits accruing therefrom under 35 U.S.C. § 119, the content of which in its entirety is herein incorporated by reference.

BACKGROUND

1. Field

The disclosure relates to a liquid crystal lens panel and a method of manufacturing a display device using the liquid crystal lens panel.

2. Description of the Related Art

Recently, a three-dimensional image display device that displays both a two-dimensional image and a three-dimensional image has been developed. The three-dimensional image display device includes a display panel that generates an image light, e.g., light corresponding to an image, and a liquid crystal lens panel that switches the image light from the display panel to light corresponding to the two-dimensional image or light corresponding to the three-dimensional image. The display panel and the liquid crystal lens panel may be attached to each other by a curable resin.

When no source voltage is applied to the liquid crystal lens panel, the image light from the display panel transmits through the liquid crystal lens panel. When the source voltage is applied to the liquid crystal lens panel, an arrangement of liquid crystal molecules of the liquid crystal lens panel is controlled. The liquid crystal lens panel, in which the arrangement of the liquid crystal molecules is controlled, may function as a convex lens or a Fresnel lens. The image light exiting from the display panel is refracted by the liquid crystal lens panel that functions as the convex lens or the Fresnel lens. The refracted image light by the liquid crystal lens panel is perceived by a viewer as the three-dimensional image.

SUMMARY

The disclosure provides a liquid crystal lens panel having improved optical properties.

The disclosure provides a method of manufacturing a display device using the liquid crystal lens panel.

Exemplary embodiments of the invention provide a liquid crystal lens panel including a first substrate which includes a lens area, a non-lens area disposed adjacent to the lens area, and a cutting area disposed adjacent to the non-lens area and including a liquid crystal driving part, a second substrate disposed opposite to the first substrate, and a liquid crystal layer interposed between the first substrate and the second substrate. In such an embodiment, the liquid crystal driving part applies a liquid crystal driving voltage to the liquid crystal layer through the non-lens area, and liquid crystal molecules of the liquid crystal layer are driven substantially in a vertical direction by the liquid crystal driving voltage.

In an exemplary embodiment, the first substrate may include a plurality of first electrodes disposed in the lens area, extending in a first direction, and spaced apart from each other, and the second substrate may include a common electrode disposed opposite to the first electrodes.

In an exemplary embodiment, the liquid crystal driving voltage may include a first voltage applied to the first electrodes and a second voltage applied to the common electrode, and the liquid crystal molecules of the liquid crystal layer may be driven substantially in the vertical direction by an electric field generated by the first voltage and the second voltage.

In an exemplary embodiment, the first substrate may further include a plurality of data pads disposed in the non-lens area and connected to the first electrodes.

In an exemplary embodiment, the liquid crystal driving part may include a plurality of first lines respectively connected to the first electrodes through the data pads, a first common line connected to the first lines, a first pad which receives the first voltage, a first sub-line connected to the first pad and the first common line, a sub-common line connected to the common electrode through the non-lens area, and a second pad connected to the sub-common line and which receives the second voltage.

In an exemplary embodiment, the cutting area may include a plurality of intermediate areas corresponding to areas between the data pads, and the first pad and the second pad may be disposed in one of the intermediate areas.

In an exemplary embodiment, the first substrate may include a plurality of first electrodes disposed in the lens area, extending in a first direction, and spaced apart from each other, an insulating layer disposed on the first electrodes, and a plurality of second electrodes extending in the first direction on the insulating layer in the lens area, spaced apart from each other, and alternately arranged with the first electrodes. In such an embodiment, the second substrate may include a common electrode, and the liquid crystal driving voltage may include a first voltage applied to the first and second electrodes and a second voltage applied to the common electrode.

In an exemplary embodiment, a height difference between an upper surface of the first electrodes and an upper surface of the insulating layer may be equal to or smaller than about 2000 angstroms.

In an exemplary embodiment, the first substrate further may include a plurality of data pads connected to the first electrodes and the second electrodes in the non-lens area.

In an exemplary embodiment, the liquid crystal driving part may include a plurality of first lines connected to the first electrodes through the data pads, a plurality of second lines connected to the second electrodes through the data pads, a first common line connected to the first lines, a second common line connected to the second lines, a first pad which receives the first voltage, at least one first sub-line connected to the first pad and the first common line, a second sub-line connected to the first pad and the second common line, a sub-common line connected to the common electrode through the non-lens area, and a second pad connected to the sub-common line and which receives the second voltage.

Exemplary embodiments of the invention provide a method of manufacturing a display device including preparing a display panel, coating an adhesive member on the display panel, attaching a liquid crystal lens panel including a liquid crystal layer to the display panel using the adhesive member, driving liquid crystal molecules of the liquid crystal layer substantially in a vertical direction, and irradiating an ultraviolet light onto the adhesive member through the liquid crystal lens panel to cure the adhesive member.

In an exemplary embodiment, the liquid crystal lens panel may include a first substrate which includes a lens area, a non-lens area, and a cutting area including a liquid crystal driving part, a second substrate disposed opposite to the first substrate, and a liquid crystal layer interposed between the first substrate and the second substrate. In such an embodiment, the liquid crystal driving part may apply a liquid crystal driving voltage to the liquid crystal layer through the non-lens area, and liquid crystal molecules of the liquid crystal layer may be driven substantially in the vertical direction by the liquid crystal driving voltage.

In an exemplary embodiment, the first substrate may include a plurality of first electrodes disposed in the lens area, extending in a first direction, and spaced apart from each other, the second substrate includes a common electrode disposed opposite to the first electrodes, the liquid crystal driving voltage may include a first voltage applied to the first electrodes and a second voltage applied to the common electrode, and the liquid crystal molecules of the liquid crystal layer may be driven in the vertical direction by an electric field generated by the first voltage and the second voltage.

In an exemplary embodiment, the first substrate may further include a plurality of data pads disposed in the non-lens area and connected to the first electrodes.

In an exemplary embodiment, the liquid crystal driving part may include a plurality of first lines respectively connected to the first electrodes through the data pads, a first common line connected to the first lines, a first pad which receives the first voltage, a first sub-line connected to the first pad and the first common line, a sub-common line connected to the common electrode through the non-lens area, and a second pad connected to the sub-common line and which receives the second voltage.

In an exemplary embodiment, the cutting area may include a plurality of intermediate areas corresponding to areas between the data pads, and the first pad and the second pad may be disposed in one of the intermediate areas.

In an exemplary embodiment, the method may further include curing the adhesive member and removing the cutting area.

In an exemplary embodiment, the method may further include connecting a plurality of driving integrated circuits ("ICs") to the data pads to apply lens driving voltages to the first electrodes after the cutting area is removed.

According to exemplary embodiments of the invention, optical properties of the liquid crystal lens panel and the display device including the liquid crystal lens panel are substantially improved.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
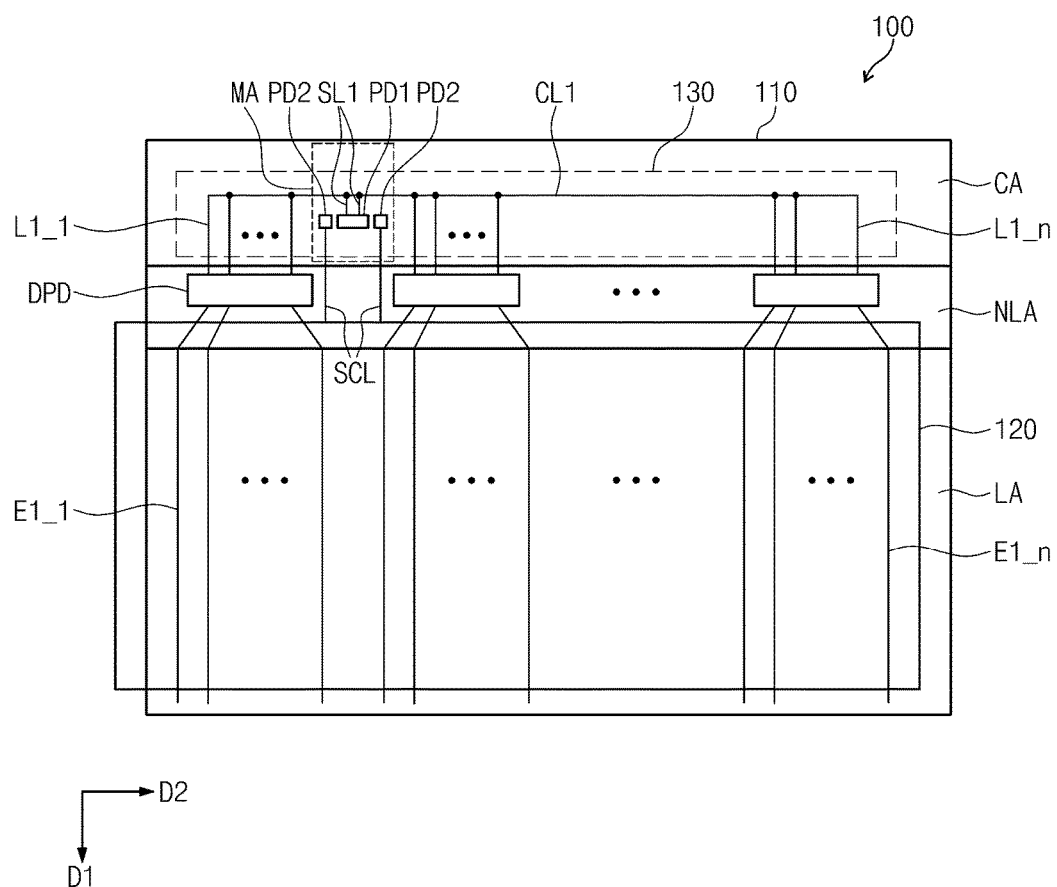
FIG. 1 is a block diagram showing an exemplary embodiment of a liquid crystal lens panel according to the invention.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

FIG. 1 is a block diagram showing an exemplary embodiment of a liquid crystal lens panel according to the invention.

Referring to FIG. 1, a liquid crystal lens panel 100 includes a first substrate 110 including a lens area LA, a non-lens area NLA and a cutting area CA, and a second substrate 120 disposed opposite to, e.g., facing, the first substrate 110 and including a first common electrode (not shown).

The non-lens area NLA is disposed adjacent to the lens area LA and the cutting area CA. A first liquid crystal layer (not shown) is disposed between the first substrate 110 and the second substrate 120. The first common electrode and the first liquid crystal layer will be described later in greater detail with reference to FIGS. 2A and 2B.

The first substrate 110 includes a plurality of first electrodes E1_1 to E1_$n$ which extends substantially in a first direction D1 in the lens area LA. The first electrodes E1_1 to E1_$n$ are spaced apart from each other with a predetermined interval therebetween. In an exemplary embodiment, the predetermined interval may be a constant interval. The first common electrode of the second substrate 120 is disposed opposite to e.g., facing, the first electrodes E1_1 to E1_$n$. The first electrodes E1_1 to E1_$n$ and the first common electrode may include a transparent conductive material.

The first substrate 110 includes a plurality of data pads DPD disposed in the non-lens area NLA. Each of the data pads DPD is connected to corresponding first electrodes of the first electrodes E1_1 to E1_$n$. The number of the corresponding first electrodes of each of the data pads DPD may be equal to or greater than 2.

A liquid crystal driving part 130 is disposed in the cutting area CA of the first substrate 110. The liquid crystal driving part 130 applies a liquid crystal driving voltage to the first liquid crystal layer through the non-lens area NLA. In an exemplary embodiment, the liquid crystal driving part 130 applies the liquid crystal driving voltage to the first electrodes E1_1 to E1_$n$ and the first common electrode through the data pads DPD. The liquid crystal driving voltage includes a first voltage applied to the first electrodes E1_1 to E1_$n$ and a second voltage applied to the first common electrode. The second voltage has a level lower than a level of the first voltage.

The liquid crystal driving part 130 includes a plurality of first lines L1_1 to L1_$n$, a first common line CL1, a plurality of first sub-lines SL1, a plurality of sub-common lines SCL, a first pad PD1, a plurality of second pads PD2, and a plurality of intermediate areas MA.

In an exemplary embodiment, the number of the first lines L1_1 to L1_$n$ may be equal to the number of the first electrodes E1_1 to E1_$n$. In such an embodiment, the first lines L1_1 to L1_$n$ correspond to the first electrodes E1_1 to E1_$n$, respectively. Each of the data pads DPD is connected to the corresponding first lines of the first lines L1_1 to L1_$n$. The first lines L1_1 to L1_$n$ extend substantially in the first direction D1 and are connected to the first electrodes E1_1 to E1_$n$, respectively, through the data pads DPD.

The first common line CL1 extends substantially in a second direction D2 crossing, e.g., substantially perpendicular to, the first direction D1 and is connected to the first lines L1_1 to L1_$n$.

Each intermediate area MA of the cutting area CA corresponds to an area between two adjacent data pads DPD. In one exemplary embodiment, for example, a width of each intermediate area MA in the second direction D2 is substantially equal to a distance between two adjacent data pads DPD corresponding thereto, and each intermediate area MA is a portion of the cutting area CA corresponding to the area between two adjacent data pads DPD. The first sub-lines SL1, the sub-common lines SCL, the first pad PD1 and the second pad PD2 may be disposed in a same intermediate area MA of the intermediate areas MA, but not being limited thereto or thereby. In an exemplary embodiment, the first sub-lines SL1, the sub-common lines SCL, the first pad PD1, and the second pad PD2 may be disposed at a leftmost area or a rightmost area of the cutting area CA.

In one exemplary embodiment, for example, the number of each of the first sub-lines SL1, the sub-common lines SCL and the second pads PD2 provided therein may be two, but not being limited thereto. In an alternative exemplary embodiment, the number of each of the first sub-lines SL1, the sub-common lines SCL and the second pads PD2 may be less or more than two.

The first sub-lines SL1 extend substantially in the first direction D1. The first sub-lines SL1 are disposed between the first common line CL1 and the first pad PD1 and connected to the first common line CL1 and the first pad PD1.

The sub-common lines SCL extend substantially in the first direction D1 and are connected to the second pads PD2 and the first common electrode of the second substrate 120. In an exemplary embodiment, a conductive spacer (not shown) may be provided between, e.g., attached to, the first and second substrates 110 and 120. In such an embodiment, the conductive spacer may be in contact with the first common electrode of the second substrate 120. In an exemplary embodiment, the sub-common lines SCL are connected to the conductive spacer attached to the first substrate 110. In such an embodiment, the sub-common lines SCL are electrically connected to the first common electrode of the second substrate 120.

The second voltage may be applied to the second pads PD2 through a probe, which is in contact with the second pads PD2. The second voltage applied to the second pads PD2 is applied to the first common electrode of the second substrate 120 through the sub-common lines SCL corresponding to the second pads PD2 in contact with the probe.

In an exemplary embodiment, the number of the second pads PD2 may be equal to or greater than 2. In such an embodiment, when one of the second pads PD2 is disconnected, the disconnected second pad PD2 may be efficiently replaced with another second pad PD2.

Figure 2A:
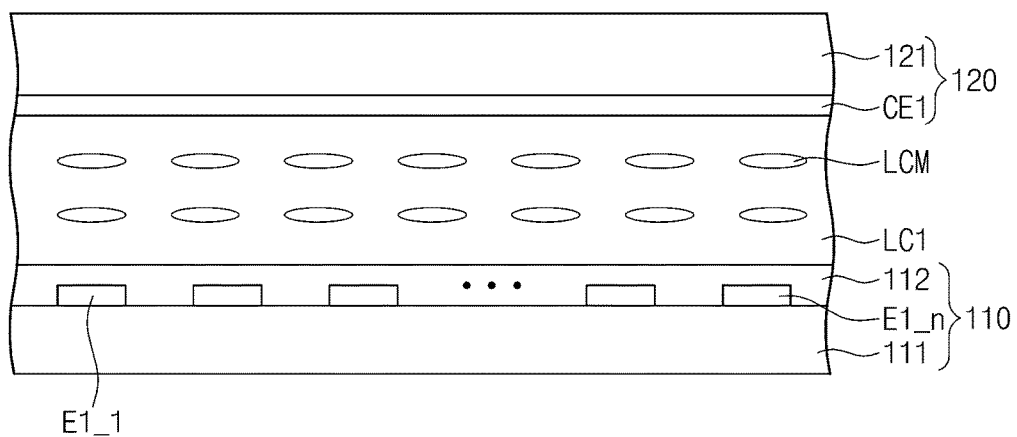
FIGS. 2A and 2B are cross-sectional views showing a lens area of the liquid crystal lens panel shown in FIG. 1.
Figure 2B:
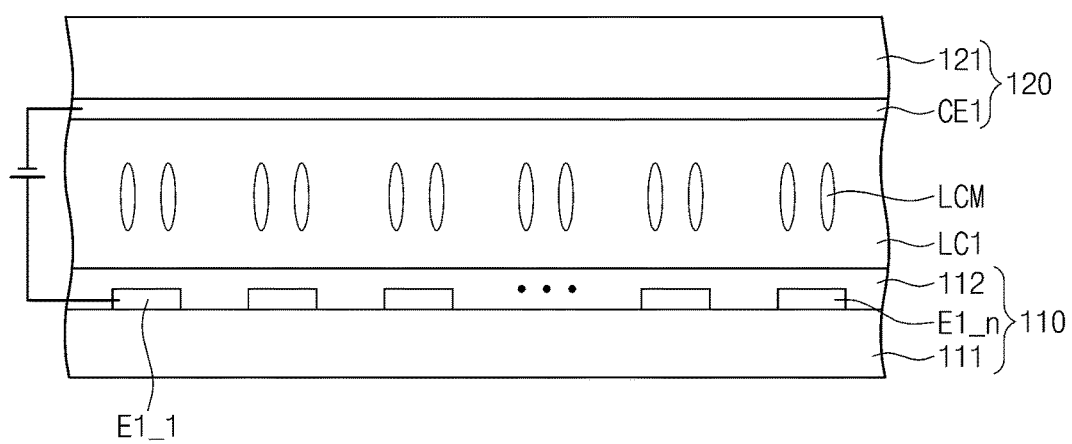

FIGS. 2A and 2B are cross-sectional views showing a lens area of the liquid crystal lens panel shown in FIG. 1. FIG. 2A is a cross-sectional view showing the lens area LA in the second direction D2 when the electric field is not generated to the liquid crystal lens panel, and FIG. 2B is a cross-sectional view showing the lens area LA in the second direction D2 when the electric field is generated the liquid crystal lens panel.

Referring to FIGS. 2A and 2B, the lens area LA of the liquid crystal lens panel 100 includes the first substrate 110, the second substrate 120 opposite to the first substrate 110, and the first liquid crystal layer LC1 interposed between the first substrate 110 and the second substrate 120. The first liquid crystal layer LC1 includes liquid crystal molecules LCM. In an exemplary embodiment, the first and second substrates 110 and 120 may be combined to each other by a first sealant (not shown).

The first substrate 110 includes a first base substrate 111, the first electrodes E1_1 to E1_$n$ disposed on the first base substrate 111, and an insulating layer 112 disposed on the first base substrate 111 to cover the first electrodes E1_1 to E1_$n$.

The second substrate 120 includes a second base substrate 121 and the first common electrode CE1 disposed on the second base substrate 121. The first common electrode CE1 is disposed opposite to, e.g., facing, the first electrodes E1_1 to E1_$n$.

When the first and second voltages are not applied to the first electrodes E1_1 to E1_$n$ and the first common electrode CE1, the liquid crystal molecules LCM of the first liquid crystal layer LC1 are aligned substantially in a horizontal direction, as shown in FIG. 2A.

As described above, in an exemplary embodiment, the first voltage is applied to the first electrodes E1_1 to E1_$n$ and the second voltage is applied to the first common electrode CE1 by the liquid crystal driving part 130. In such an embodiment, the first electrodes E1_1 to E1_$n$ may receive a same voltage, e.g., the first voltage.

When the first voltage applied to the first electrodes E1_1 to E1_$n$ and the second voltage applied to the first common electrode CE1, the electric field is generated between the first common electrode CE1 and the first electrodes E1_1 to E1_$n$. The liquid crystal molecules LCM are driven by the electric field generated between the first common electrode CE1 and the first electrodes E1_1 to E1_$n$.

The liquid crystal driving voltage has a level defined by a difference between the first voltage applied to the first electrodes E1_1 to E1_$n$ and the second voltage applied to the first common electrode CE1.

The liquid crystal molecules LCM are driven substantially in a vertical direction from the horizontal direction and substantially proportional to the level of the liquid crystal driving voltage to have a predetermined angle. The liquid crystal molecules LCM are not driven when the liquid crystal driving voltage has the level greater than a predetermined voltage level, e.g., a critical voltage. The liquid crystal driving voltage may be set to have a level equal to or greater than the critical voltage. When the level of the liquid crystal driving voltage is equal to or greater than the critical voltage, the liquid crystal molecules LCM may be driven substantially in the vertical direction. In such an embodiment, the liquid crystal molecules LCM of the first liquid crystal layer LC1 may be driven in the vertical direction by the liquid crystal driving voltage.

In an exemplary embodiment, the first electrodes E1_1 to E1_$n$ are spaced apart from each other with a predetermined distance. Due to a space between the first electrodes E1_1 to E1_$n$, the electric field generated between the first common electrode CE1 and the first electrodes E1_1 to E1_$n$ may have a portion that is not substantially vertical, e.g., a portion having a horizontal component. When the level of the liquid crystal driving voltage is equal to or greater than the critical voltage, the liquid crystal molecules LCM are driven substantially in the vertical direction in the area in which the direction of the electric field is substantially vertical. The liquid crystal molecules LCM may be driven to a maximum extent in the vertical direction in the area in which the direction of the electric field is not substantially vertical due to the horizontal component thereof and inclined at a predetermined angle, e.g., an acute angle less than 90 degrees. When the level of the liquid crystal driving voltage is equal to or greater than the critical voltage, the liquid crystal molecules LCM may be driven to a maximum extent in the vertical direction. In such an embodiment, the liquid crystal molecules LCM may be driven substantially in the vertical direction by the liquid crystal driving voltage.

An exemplary embodiment of the display device that displays the three-dimensional image includes the display panel that generates an image light, that is light corresponding to an image to be displayed thereon, and the liquid crystal lens panel that refracts the image light provided from the display panel to provide the three-dimensional image to a viewer. In an exemplary embodiment, the liquid crystal lens panel may be the exemplary embodiment of the liquid crystal lens panel 100 shown in FIG. 1. The liquid crystal lens panel 100 may function as a Fresnel lens based on the voltage applied thereto.

In an exemplary embodiment, the display panel and the liquid crystal lens panel 100 may be attached to each other by an adhesive member (not shown). In one exemplary embodiment, for example, the adhesive member may be an ultraviolet light curable resin. In such an embodiment, the ultraviolet light may be irradiated onto the adhesive member through the liquid crystal lens panel 100 to cure the adhesive member.

When the ultraviolet light is irradiated onto the liquid crystal lens panel 100 while the liquid crystal molecules LCM of the liquid crystal lens panel 100 are aligned in the horizontal direction, the liquid crystal molecules LCM may be substantially damaged, and the optical properties of the liquid crystal lens panel 100 are thereby degraded.

When the liquid crystal molecules LCM are aligned substantially in the vertical direction or aligned in the vertical direction to the maximum extent, an area in which the liquid crystal molecules LCM are irradiated by the ultraviolet light is substantially reduced. Accordingly, the liquid crystal molecules LCM are effectively prevented from being damaged by the ultraviolet light.

In an exemplary embodiment, the liquid crystal molecules LCM of the liquid crystal lens panel 100 may be driven substantially in the vertical direction by the liquid crystal driving part 130. The liquid crystal molecules LCM of the first liquid crystal layer LC1 are driven in the vertical direction by the liquid crystal driving part 130 after the display panel is attached to the liquid crystal lens panel 100 by the adhesive member. Then, the ultraviolet light is irradiated onto the liquid crystal lens panel 100, thereby curing the adhesive member.

In such an embodiment, the liquid crystal molecules LCM are aligned substantially in the vertical direction by the liquid crystal driving part 130 when the ultraviolet light is irradiated onto the liquid crystal lens panel 100, and the damage on the liquid crystal molecules LCM is thereby substantially reduced compared to the liquid crystal molecules LCM aligned substantially in the horizontal direction when the ultraviolet light is irradiated onto the liquid crystal lens panel 100. Accordingly, in such an embodiment, optical properties of the liquid crystal lens panel 100 are substantially improved.

In an exemplary embodiment, the first liquid crystal layer LC1 including the liquid crystal molecules LCM, which are initially aligned substantially in the horizontal direction and driven substantially in the vertical direction by the electric field, has been described with reference to FIGS. 2A and 2B. However, in an alternative exemplary embodiment, various liquid crystal modes driven substantially in the vertical direction by the liquid crystal driving voltage may be used as the first liquid crystal layer LC1. In one exemplary embodiment, for example, the first liquid crystal layer LC1 may include an electrically controlled birefringence ("ECB") mode liquid crystal, an optically compensated bend ("OCB") mode liquid crystal, or a hybrid aligned nematic ("HAN") mode liquid crystal.

Figure 3:
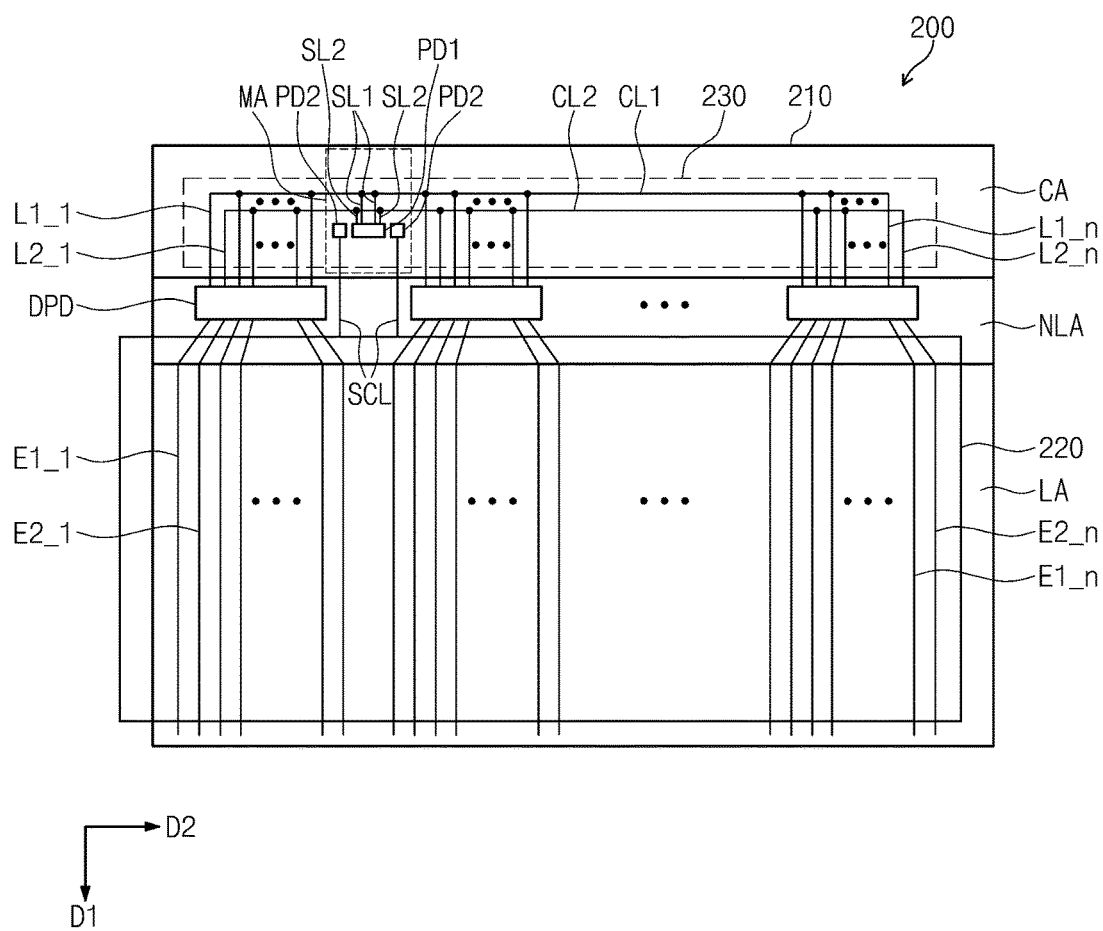
FIG. 3 is a block diagram showing an alternative exemplary embodiment of a liquid crystal lens panel according to the invention.

FIG. 3 is a block diagram view showing an alternative exemplary embodiment of a liquid crystal lens panel according to the invention.

The liquid crystal lens panel 200 shown in FIG. 3 is substantially the same as the liquid crystal lens panel 100 except for the electrodes of the lens area LA and the lines of the liquid crystal driving part 230.

Referring to FIG. 3, a liquid crystal lens panel 200 includes a first substrate 210 including a lens area LA, a non-lens area NLA and a cutting area CA, and a second substrate 220 disposed opposite to the first substrate 210 and including a first common electrode (not shown).

The first substrate 210 includes a plurality of first electrodes E1_1 to E1_$n$ and a plurality of second electrodes E2_1 to E2_$n$ in the lens area LA. The first electrodes E1_1 to E1_$n$ and the second electrodes E2_1 to E2_$n$ extend substantially in a first direction D1. The first electrodes E1_1 to E1_$n$ are spaced apart from each other with a predetermined interval therebetween. The second electrodes E2_1 to E2_$n$ are spaced apart from each other with a predetermined interval therebetween. In an exemplary embodiment, the predetermined interval of the first electrodes E1_1 to E1_$n$ or the second electrodes E2_1 to E2_$n$ may be a constant interval. The first electrodes E1_1 to E1_$n$ are alternately arranged with the second electrodes E2_1 to E2_$n$. The number of the first electrodes E1_1 to E1_$n$ may be equal to the number of the second electrodes E2_1 to E2_$n$. The first electrodes E1_1 to E1_$n$ and the second electrodes E2_1 to E2_$n$ may include a transparent conductive material.

The first substrate 210 includes a plurality of data pads DPD disposed in the non-lens area NLA. Each of the data pads DPD is connected to corresponding first electrodes of the first electrodes E1_1 to E1_$n$ and corresponding second electrodes of the second electrodes E2_1 to E2_$n$. The number of the corresponding first electrodes E1_1 to E1_$n$ connected to one data pad DPD may be equal to the number of the corresponding second electrodes E2_1 to E2_$n$ connected to the one data pad DPD.

The liquid crystal driving part 230 is disposed in the cutting area CA of the first substrate 210. The liquid crystal driving part 230 applies a liquid crystal driving voltage to the first liquid crystal layer through the non-lens area NLA. In an exemplary embodiment, the liquid crystal driving part 230 applies the liquid crystal driving voltage to the first electrodes E1_1 to E1_$n$, the second electrodes E2_1 to E2_$n$, and the first common electrode through the data pads DPD. The liquid crystal driving voltage includes a first voltage applied to the first electrodes E1_1 to E1_$n$ and the second electrodes E2_1 to E2_$n$ and a second voltage applied to the first common electrode. The second voltage may have a level lower than a level of the first voltage.

The liquid crystal driving part 230 includes a plurality of first lines L1_1 to L1_$n$, a plurality of second lines L2_1 to L2_$n$, a first common line CL1, a second common line CL2, a plurality of first sub-lines SL1, a plurality of second sub-lines SL2, a plurality of sub-common lines SCL, a first pad PD1, a plurality of second pads PD2, and a plurality of intermediate areas MA.

The connection of the first electrodes E1_1 to E1_$n$, the first lines L1_1 to L1_$n$, the first common line CL1 and the first sub-lines SL1 in the liquid crystal lens panel 200 shown in FIG. 3 is substantially the same as the connection thereof in the liquid crystal lens panel 100 shown in FIG. 1, and thus any repetitive detailed descriptions thereof will be omitted.

The second lines L2_1 to L2_$n$ are alternately arranged with the first lines L1_1 to L1_$n$, and connected to the second common line CL2. The number of the second lines L2_1 to L2_$n$ is equal to the number of the first lines L1_1 to L1_$n$. In such an embodiment, the second lines L2_1 to L2_$n$ correspond to the second electrodes E2_1 to E2_$n$, respectively. Each of the data pads DPD is connected to corresponding second lines of the second lines L2_1 to L2_$n$. The second lines L2_1 to L2_$n$ extend substantially in the first direction D1 and are connected to the second electrodes E2_1 to E2_$n$, respectively, through the data pads DPD.

The second common line CL2 is extended in a second direction D2 crossing, e.g., substantially perpendicular to, the first direction D1 and connected to the second lines L2_1 to L2_$n$.

The second sub-lines SL2 are disposed in the intermediate areas MA, in which the first sub-lines SL1, the sub-common lines SCL, the first pad PD1 and the second pads PD2 are disposed.

In one exemplary embodiment, for example, the number of the second sub-lines SL2 provided therein is two, but not being limited thereto. In an alternative exemplary embodiment, the number of the second sub-lines SL2 may be less or more than two.

The second sub-lines SL2 extend substantially in the first direction D1. The second sub-lines SL2 are disposed between the second common line CL2 and the first pad PD1 and connected to the second common line CL2 and the first pad PD1.

The first sub-lines SL1 are disposed between the second sub-lines SL2. In one exemplary embodiment, for example, two first sub-lines SL1 are disposed between two second sub-lines SL2, but not being limited thereto or thereby. In an alternative exemplary embodiment, the second sub-lines SL2 may be disposed between the first sub-lines SL1.

The sub-common lines SCL extend substantially in the first direction D1 and are connected to the second pads PD2 and the first common electrode of the second substrate 120.

In an exemplary embodiment, the probes (not shown) may be in contact with one of the first pad PD1 and the second pads PD2. The first voltage is applied to the first pad PD1 through the probe in contact with the first pad PD1. The first voltage applied to the first pad PD1 is applied to the data pads DPD through the first sub-lines SL1, the first common line CL1 and the first lines L1_1 to L1_n. The first voltage applied to the data pads DPD is applied to the first electrodes E1_1 to E1_n. In such an embodiment, the first voltage applied to the first pad PD1 is applied to the data pads DPD through the second sub-lines SL2, the second common line CL2 and the second lines L2_1 to L2_n. The first voltage applied to the data pads DPD is applied to the second electrodes E2_1 to E2_n.

The second voltage is applied to the second pads PD2 through the probe in contact with the second pads PD2. The second voltage applied to the second pads PD2 is applied to the first common electrode of the second substrate 220 through the sub-common lines SCL corresponding to the second pads PD2 in contact with the probe.

Figure 4A:
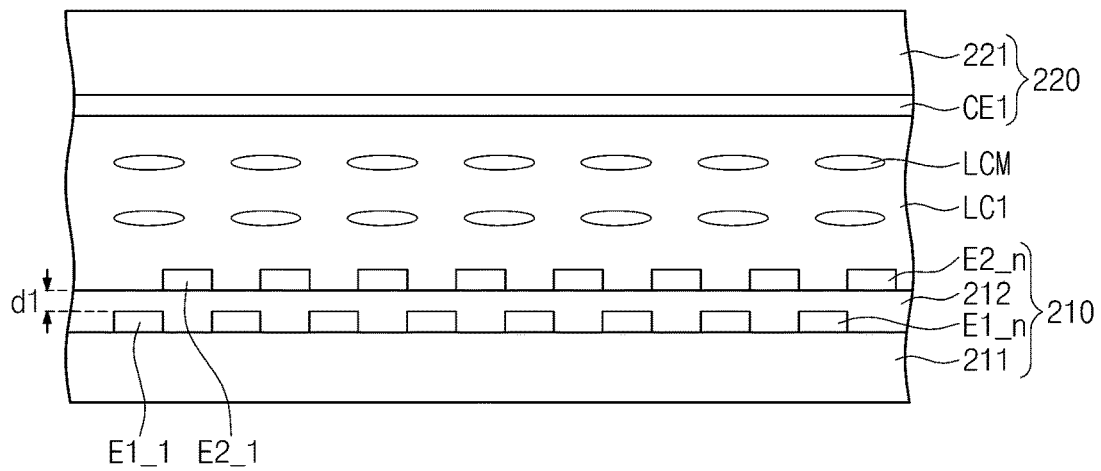
FIGS. 4A and 4B are cross-sectional views showing a lens area of the liquid crystal lens panel shown in FIG. 3.
Figure 4B:
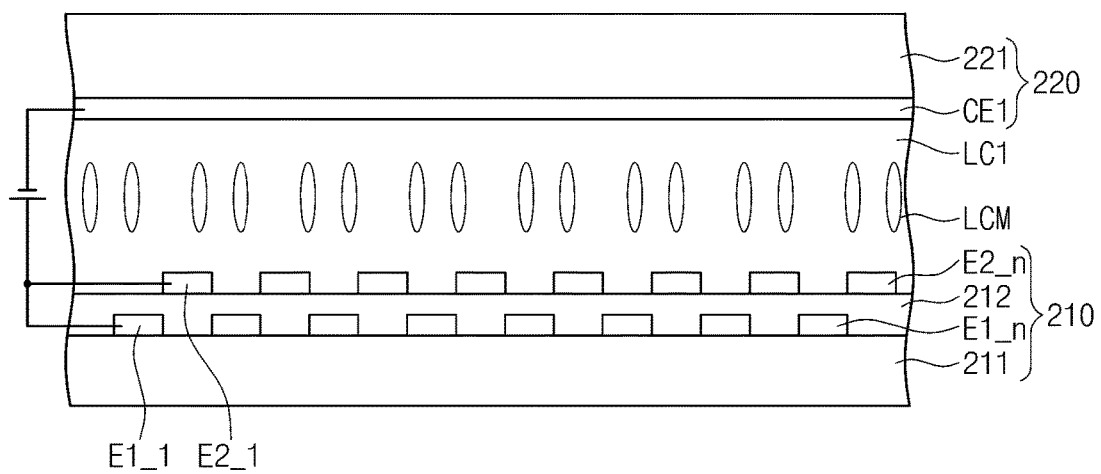

FIGS. 4A and 4B are cross-sectional views showing a lens area of the liquid crystal lens panel shown in FIG. 3. FIG. 4A is a cross-sectional view showing the lens area LA in the second direction D2 when the electric field is not generated in the liquid crystal lens panel, and FIG. 4B is a cross-sectional view showing the lens area LA in the second direction D2 when the electric field is generated the liquid crystal lens panel.

Referring to FIGS. 4A and 4B, the lens area LA of the liquid crystal lens panel 200 includes the first substrate 210, the second substrate 220 opposite to the first substrate 210, and the first liquid crystal layer LC1 interposed between the first substrate 210 and the second substrate 220.

The first substrate 210 includes a first base substrate 211, the first electrodes E1_1 to E1_n disposed on the first base substrate 211, an insulating layer 212 disposed on the first base substrate 211 to cover the first electrodes E1_1 to E1_n, and the second electrodes E2_1 to E2_n disposed on the insulating layer 212.

The first electrodes E1_1 to E1_n and the second electrodes E2_1 to E2_n are alternately disposed with each other on different layers. In one exemplary embodiment, for example, the second electrodes E2_1 to E2_n are spaced apart from each other and disposed on the insulating layer and respectively correspond to areas between the first electrodes E1_1 to E1_n.

The second substrate 220 includes a second base substrate 221 and the first common electrode CE1 disposed on the second base substrate 221.

When the first and second voltages are not applied to the first electrodes E1_1 to E1_n, the second electrodes E2_1 to E2_n and the first common electrode CE1, the liquid crystal molecules LCM of the first liquid crystal layer LC1 are aligned substantially in a horizontal direction, as shown in FIG. 4A.

As described above, the first voltage is applied to the first electrodes E1_1 to E1_n and the second electrodes E2_1 to E2_n and the second voltage is applied to the first common electrode CE1 by the liquid crystal driving part 130. In an exemplary embodiment, the first electrodes E1_1 to E1_n and the second electrodes E2_1 to E2_n commonly receive the first voltage.

When the first voltage is applied to the first electrodes E1_1 to E1_n and the second electrodes E2_1 to E2_n and the second voltage is applied to the first common electrode CE1, the electric field is generated between the first common electrode CE1 and the first electrodes E1_1 to E1_n and between the first common electrode CE1 and the second electrodes E2_1 to E2_n. The liquid crystal molecules LCM are driven by the electric field generated between the first common electrode CE1 and the first electrodes E1_1 to E1_n and between the first common electrode CE1 and the second electrodes E2_1 to E2_n.

In such an embodiment, as described above, the level of the liquid crystal driving voltage is equal to or greater than the critical voltage. When the level of the liquid crystal driving voltage is set to equal to or greater than the critical voltage, the liquid crystal molecules LCM may be driven substantially in the vertical direction. In an exemplary embodiment, the first electrodes E1_1 to E1_n are alternately arranged with the second electrodes E2_1 to E2_n. Accordingly, the electric field is generated substantially in the vertical direction between the first common electrode CE1 and the first electrodes E1_1 to E1_n and between the first common electrode CE1 and the second electrodes E2_1 to E2_n.

The level of the first voltage applied to the first electrodes E1_1 to E1_n is lowered by the insulating layer 212 disposed on the first electrodes E1_1 to E1_n, as a voltage drop occurs by an inherent resistance of the insulating layer 212. Thus, a voltage difference between the first common electrode CE1 and the first electrodes E1_1 to E1_n may be less than a voltage difference between the first voltage and the second voltage by the inherent resistance of the insulating layer 212 disposed on the first electrodes E1_1 to E1_n. In such an embodiment, the voltage difference between the first common electrode CE1 and the first electrodes E1_1 to E1_n may be different from the voltage difference between the first common electrode CE1 and the second electrodes E2_1 to E2_n. In such an embodiment, the level of the liquid crystal driving voltage between the first common electrode CE1 and the first electrodes E1_1 to E1_n may be different from the level of the liquid crystal driving voltage between the first common electrode CE1 and the second electrodes E2_1 to E2_n.

An intensity of the electric field is substantially proportional to the level of the voltage, and the intensity of the electric fields may be different from each other when the voltages having different levels are applied. In an exemplary embodiment, as described above, the difference between the liquid crystal driving voltage between the first common electrode CE1 and the first electrodes E1_1 to E1_n and the liquid crystal driving voltage between the first common electrode CE1 and the second electrodes E2_1 to E2_n may occur. In an exemplary embodiment, when a height difference between an upper surface of the first electrodes E1_1 to E1_n and an upper surface of the insulating layer 212, e.g., a first difference d1 in FIGS. 4A and 4B, is equal to or less than about 2000 angstroms, the voltage drop of about 0.1 volt or less occurs. When the difference between the liquid crystal driving voltage between the first common electrode CE1 and the first electrodes E1_1 to E1_n and the liquid crystal driving voltage between the first common electrode CE1 and the second electrodes E2_1 to E2_n is equal to or less than about 0.1 volt, the liquid crystal molecules LCM may be driven substantially in the vertical direction.

In one exemplary embodiment, for example, the first voltage of about 10 volts is applied to the first electrodes E1_1 to E1_n and the second electrodes E2_1 to E2_n and the second voltage of about zero (0) volt is applied to the first common electrode CE1. The voltage difference between the first common electrode CE1 and the second electrodes E2_1 to E2_n is about 10 volts. When the first difference d1 is equal to or less than about 2000 angstroms, the voltage difference between the first common electrode CE1 and the first electrodes E1_1 to E1_n is equal to or greater than about 9.9 volt. Accordingly, in an exemplary embodiment, when the first difference d1 is equal to or less than about 2000 angstroms, the difference between the liquid crystal driving voltage between the first common electrode CE1 and the first electrodes E1_1 to E1_n and the liquid crystal driving voltage between the first common electrode CE1 and the second electrodes E2_1 to E2_n is equal to or smaller than about 0.1 volt.

The liquid crystal molecules LCM of the liquid crystal lens panel 200 may be driven substantially in the vertical direction by the liquid crystal driving part 230. The liquid crystal molecules LCM of the first liquid crystal layer LC1 are driven substantially in the vertical direction by the liquid crystal driving part 230 after the display panel is attached to the liquid crystal lens panel 200 by the adhesive member. Then, the ultraviolet light is irradiated onto the liquid crystal lens panel 200, such that the adhesive member is cured.

In an exemplary embodiment, the liquid crystal molecules LCM are driven substantially in the vertical direction when the ultraviolet light is irradiated onto the liquid crystal lens panel 200, such that the damage on the liquid crystal molecules LCM is substantially reduced compared to the liquid crystal molecules LCM aligned substantially in the horizontal direction when the ultraviolet light is irradiated onto the liquid crystal lens panel 200. Accordingly, in such an embodiment, the optical properties of the liquid crystal lens panel 100 are substantially improved.

FIGS. 5A to 5D are cross-sectional views showing an exemplary embodiment of a method of manufacturing a display device using the liquid crystal lens panel shown in FIG. 1.

In FIGS. 5A to 5D, an exemplary embodiment of the method of manufacturing the display device 500 using the liquid crystal lens panel 100 shown in FIG. 1 is shown, but the invention is not be limited thereto or thereby. In an alternative exemplary embodiment, the display device 500 may be manufactured using the liquid crystal lens panel 200 shown in FIG. 3. FIGS. 5A to 5D show the first and second substrate 110 and 120 of the liquid crystal lens panel 100, while the first electrodes E1_1 to E1_n and the first common electrode CE1 are not shown, and liquid crystal molecules LCM of a second liquid crystal layer LC2 of the display panel 300 are not shown therein for the convenience of illustration.

Figure 5A:
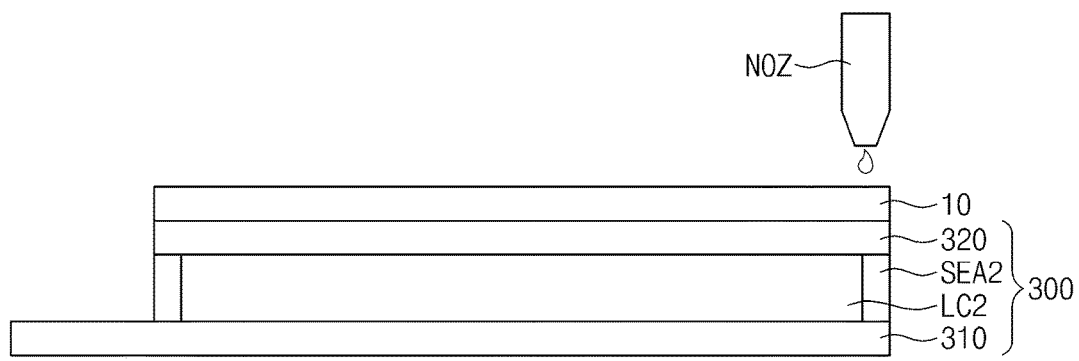
FIGS. 5A to 5D are cross-sectional views showing an exemplary embodiment of a method of manufacturing a display device using the liquid crystal lens panel shown in FIG. 1.

Referring to FIG. 5A, the display panel 300 is prepared. The display panel 300 includes an array substrate 310, on which a plurality of pixels (not shown) is disposed, an opposite substrate 320 disposed opposite to, e.g., facing, the array substrate 310, and the second liquid crystal layer LC2 interposed between the array substrate 310 and the opposite substrate 320. The array substrate 310 and the opposite substrate 320 are coupled, e.g., combined, to each other using a second sealant SEA2.

The adhesive member 10 is provided, e.g., coated, on an upper surface of the display panel 300 using a nozzle NOZ. The adhesive member 10 may be the ultraviolet light curable resin.

Figure 5B:
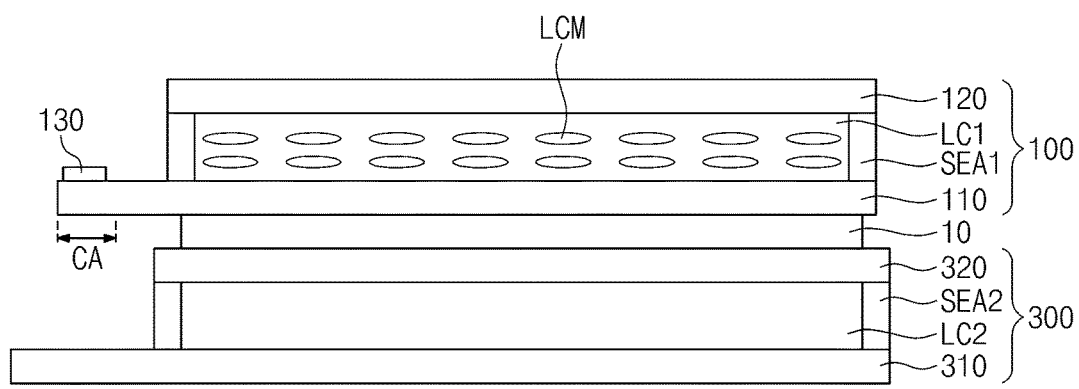

Referring to FIG. 5B, the liquid crystal lens panel 100 is disposed on the display panel 300 and attached to the adhesive member 10. In an exemplary embodiment, the display panel 300 and the liquid crystal lens panel 100 are attached to each other by the adhesive member 10. The first substrate 110 and the second substrate 120 of the liquid crystal lens panel 100 are coupled, e.g., combined, to each other by a first sealant SEA'.

Figure 5C:
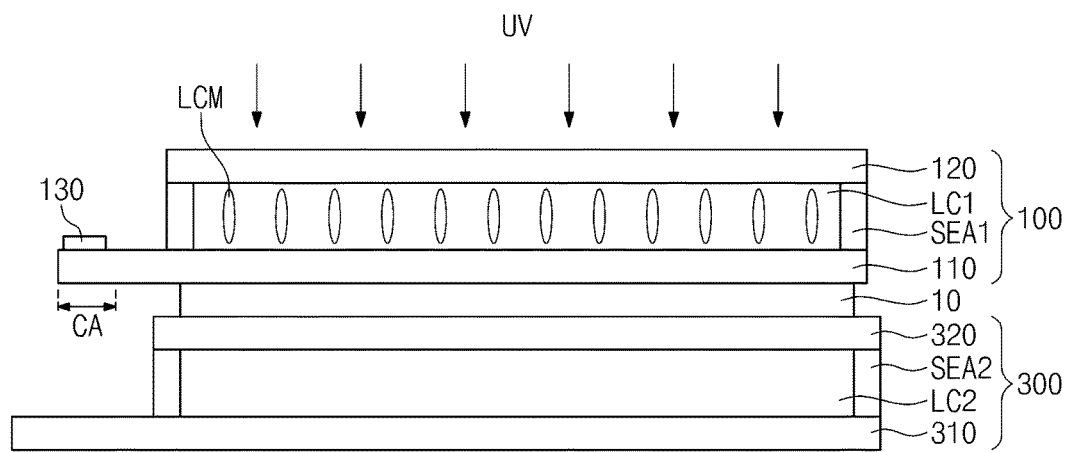

Referring to FIG. 5C, the liquid crystal molecules LCM of the liquid crystal lens panel 100 are driven substantially in the vertical direction by the liquid crystal driving voltage provided from the liquid crystal driving part 130. In an exemplary embodiment, the liquid crystal molecules LCM aligned substantially in the horizontal direction may be driven substantially in the vertical direction after the display panel 300 is attached to the liquid crystal lens panel 100 by the adhesive member 10. Then, the ultraviolet light is irradiated onto the adhesive member 10 through the liquid crystal lens panel 100 to cure the adhesive member 10. The adhesive member 10 may be cured by the ultraviolet light.

Figure 5D:
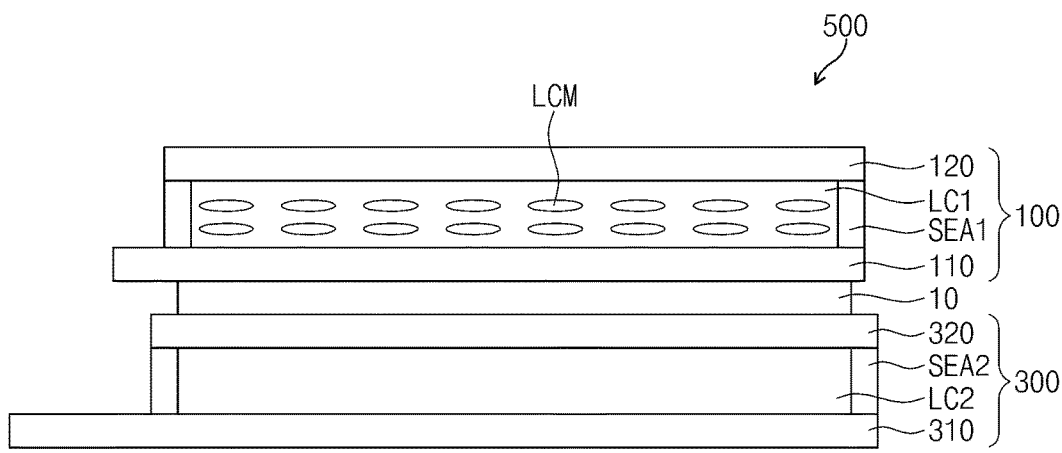

Referring to FIG. 5D, after the adhesive member 10 is cured, the cutting area CA is removed, e.g., detached, from the first substrate 110. Although not shown in figures, driving integrated circuits ("IC"s) may be connected to the data pads DPD after the cutting area CA is removed. The driving ICs apply lens driving voltages to the first electrodes E1_1 to E1_n and the first common electrode CE1 through the data pads DPD to drive the liquid crystal lens panel 100 as the Fresnel lens.

According to the method of manufacturing the display device 500 using the liquid crystal lens panel 100, the liquid crystal molecules LCM are driven substantially in the vertical direction when the adhesive member 10 is cured by irradiating the ultraviolet light to the liquid crystal lens panel 100. Thus, in such an embodiment, the damage on the liquid crystal molecules LCM is substantially reduced compared to the liquid crystal molecules LCM aligned substantially in the horizontal direction when the adhesive member 10 is cured by irradiating the ultraviolet light to the liquid crystal lens panel 100.

Accordingly, in such an embodiment, the display device 500 manufactured using the liquid crystal lens panel 100 may have substantially improved optical properties.

Figure 6:
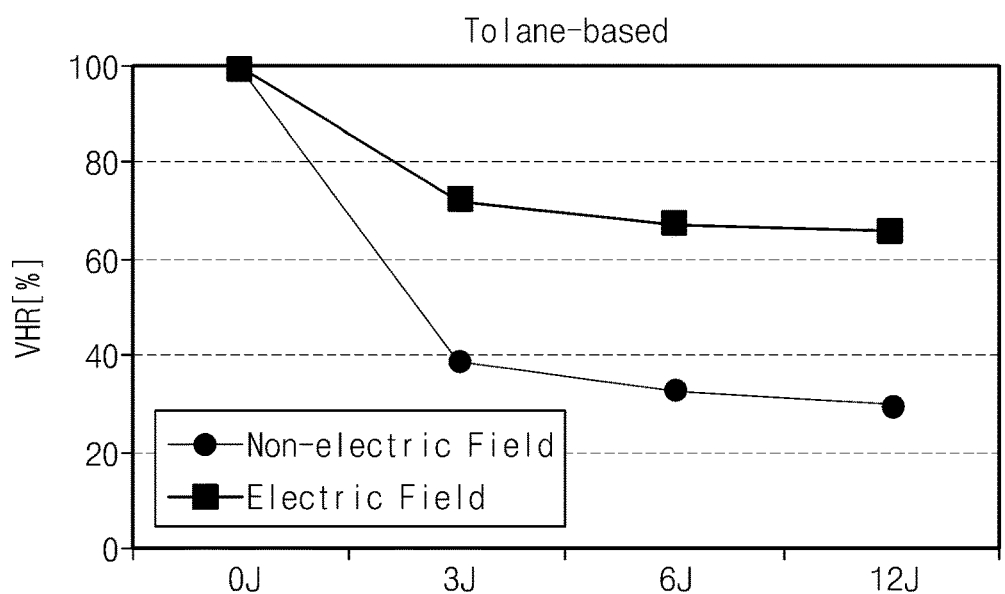
FIGS. 6 to 8 are graphs showing optical properties of liquid crystal lens panels.
Figure 7:
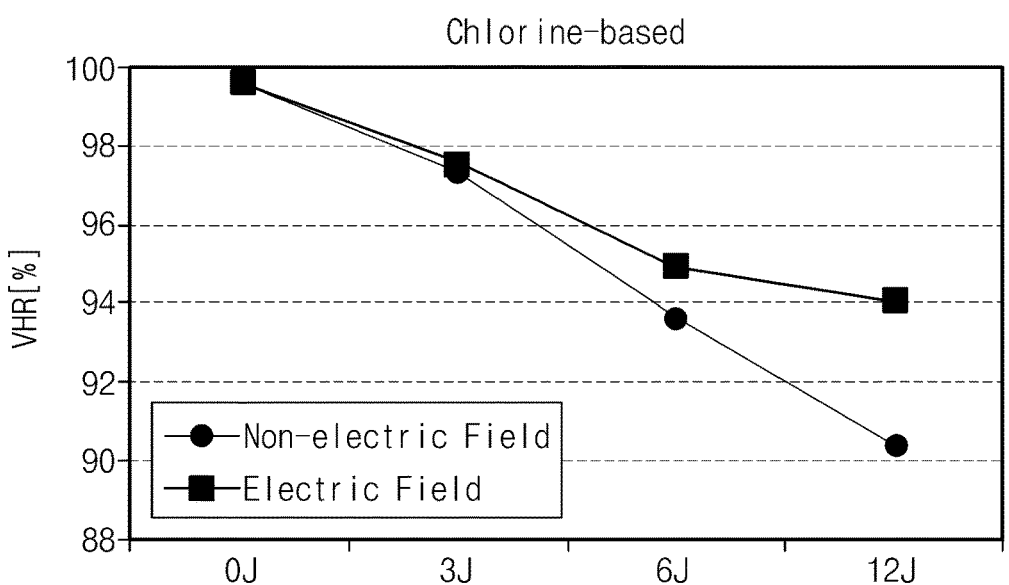
Figure 8:
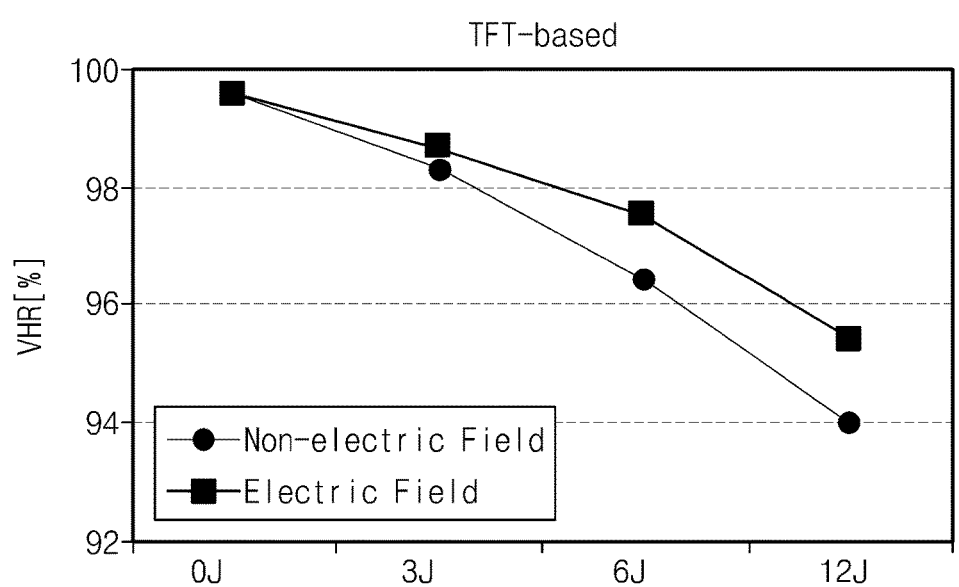

FIGS. 6 to 8 are graphs showing optical properties of liquid crystal lens panels.

FIG. 6 shows the optical properties of the liquid crystal lens panel 100 including tolane-based liquid crystal having a single crystalline structure, FIG. 7 shows the optical properties of the liquid crystal lens panel 100 including chlorine-based liquid crystal having a single crystalline structure, and FIG. 8 shows the optical properties of the liquid crystal lens panel 100 including thin-film-transistor-based ("TFT-based") liquid crystal. The TFT-based liquid crystal layer has a conventional single crystalline structure except for the tolane-based and chlorine-based liquid crystal. The TFT-based liquid crystal layer may have the single crystalline structure of phenyl-based or cyclohexane-based.

The level of the liquid crystal driving voltage has been set to about 10 volts, and a voltage holding ratio VHR of the liquid crystal lens panel after the ultraviolet light is irradiated has been measured and shown in FIGS. 6 to 8. The ultraviolet light has been indicated in joule (J).

Referring to FIGS. 6 to 8, graphs indicated by 'Electric Field' show the voltage holding ratio VHR of the liquid crystal lens panel 100, in which the liquid crystal molecules LCM are driven substantially in the vertical direction, when the adhesive member 10 is cured by the ultraviolet light. In FIGS. 6 to 8, the graphs indicated by 'Electric Field' show the voltage holding ratio VHR of the liquid crystal lens panel 100 when the liquid crystal driving voltage is applied to the first liquid crystal layer LC1 when the adhesive member 10 is cured by the ultraviolet light.

The graphs indicated by 'Non-electric Field' show the voltage holding ratio VHR of the liquid crystal lens panel 100, in which the liquid crystal molecules LCM are aligned substantially in the horizontal direction without being driven substantially in the vertical direction, when the adhesive member 10 is cured by the ultraviolet light. In FIGS. 6 to 8, the graphs indicated by 'Non-electric Field' show the voltage holding ratio VHR of the liquid crystal lens panel 100 when the liquid crystal driving voltage is not applied to the first liquid crystal layer LC1 when the adhesive member 10 is cured by the ultraviolet light.

The image displayed on the display device may be maintained when the voltage of the liquid crystal layer is maintained until a next signal voltage is applied to the liquid crystal layer after a signal voltage is applied to the liquid crystal layer. When the voltage of the liquid crystal layer is not substantially maintained until the next signal voltage is applied to the liquid crystal layer after the signal voltage is applied to the liquid crystal layer, a flickering phenomenon may occur on the image. A time period, in which the voltage of the liquid crystal layer is substantially maintained, is referred to as the voltage holding ratio VHR. As the voltage holding ratio VHR increases, the flickering phenomenon is intensified. When the liquid crystal molecules are damaged by the ultraviolet light, the voltage holding ratio VHR is substantially low.

As described above, the ultraviolet light is irradiated onto the adhesive member 10 through the liquid crystal lens panel 100 to cure the adhesive member 10 to which the display panel 300 and the liquid crystal lens panel 100 are attached.

When the liquid crystal driving voltage is not applied to the first liquid crystal layer LC1 of the liquid crystal lens panel 100, the liquid crystal molecules LCM are aligned substantially in the horizontal direction. The liquid crystal molecules LCM aligned substantially in the horizontal direction may be damaged by the ultraviolet light irradiated onto the adhesive member 10 through the liquid crystal lens panel 100. Accordingly, the voltage holding ratio VHR of the liquid crystal lens panel 100 may become low as shown in the graphs indicated by 'Non-electric Field' in FIGS. 6 to 8. That is, the optical properties of the liquid crystal lens panel 100 are degraded.

When the liquid crystal driving voltage is applied to the first liquid crystal layer LC1 of the liquid crystal lens panel 100, the liquid crystal molecules LCM are driven substantially in the vertical direction. Therefore, when the ultraviolet light is irradiated onto the adhesive member 10 through the liquid crystal lens panel 100, the damage on the liquid crystal molecules LCM driven substantially in the vertical direction is substantially reduced compared to the liquid crystal molecules LCM aligned substantially in the horizontal direction. Accordingly, the voltage holding ratio VHR of the liquid crystal lens panel 100 is substantially improved as shown in FIGS. 6 to 8. In an exemplary embodiment, as described above, the optical properties of the liquid crystal lens panel 100 are substantially improved.

In an exemplary embodiment, the voltage holding ratio VHR of the liquid crystal lens panel 100 becomes higher when the electric field is applied to the first liquid crystal LC1 of the liquid crystal lens panel 100 than when the electric field is not applied to the first liquid crystal LC1 of the liquid crystal lens panel 100. Accordingly, in such an embodiment, the optical properties of the liquid crystal lens panel 100 are substantially improved.

The graphs in FIGS. 6 to 8 show the voltage holding ratio VHR of the liquid crystal lens panel 100 shown in FIG. 1. In an alternative exemplary embodiment, the liquid crystal molecules LCM of the first liquid crystal layer LC1 of the liquid crystal lens panel 200 shown in FIG. 3 may be driven substantially in the vertical direction by applying the electric field to the first liquid crystal layer LC1 of the liquid crystal lens panel 200 as shown in FIG. 3. In such an embodiment, the optical properties of the liquid crystal lens panel 200 are substantially improved as shown in FIGS. 6 to 8.

Figure 9:
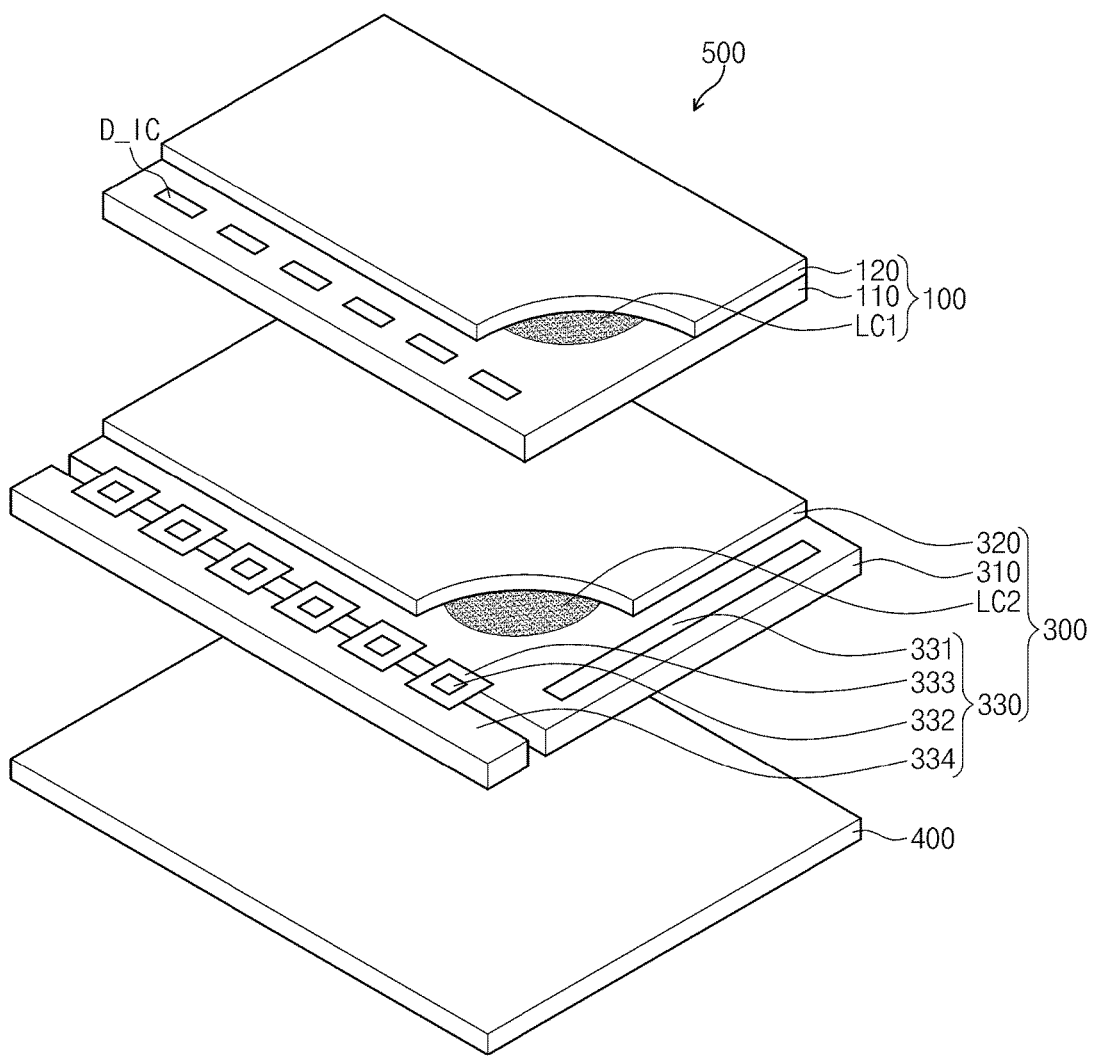
FIG. 9 is an exploded perspective view showing an exemplary embodiment of a display device manufactured using the liquid crystal lens panel according to the invention.

FIG. 9 is an exploded perspective view showing an exemplary embodiment of a display device manufactured using the liquid crystal lens panel according to the invention.

Referring to FIG. 9, a display device 500 includes the display panel 300, a backlight unit 400 that supplies light to the display panel 300, and the liquid crystal lens panel 100 disposed on the display panel 300. In an exemplary embodiment, the liquid crystal lens panel 100 shown in FIG. 1 is disposed on the display panel 300, but not being limited thereto or thereby. In an alternative exemplary embodiment, the liquid crystal lens panel 200 shown in FIG. 3 may be disposed on the display panel 300.

The display panel 300 includes the array substrate 310 on which the pixels (not shown) are disposed, the opposite substrate 320 opposite to, e.g., facing, the array substrate 310 and including the second common electrode (not shown), the second liquid crystal layer LC2 interposed between the array substrate 310 and the opposite substrate 320, and a driving part 330.

The array substrate 310 includes pixel electrodes (not shown) respectively corresponding to the pixels and thin film transistors (not shown) respectively connected to the pixel electrodes. The thin film transistors receive data voltages in response to gate signals and apply the data voltages to the pixel electrodes, respectively. When the data voltages are applied to the pixel electrodes and the common voltage is applied to the second common electrode, the arrangement of the liquid crystal molecules of the second liquid crystal layer is changed. The transmittance of the light provided from the backlight unit 400 is controlled by the changed arrangement of the liquid crystal molecules, thereby displaying an image.

The driving part 300 includes a gate driver 331, a plurality of source driving chips 332, a plurality of flexible printed circuit boards 333 respectively connected to the source driving chips 332, and a driving circuit board 334. The source driving chips 332 collectively define a data driver.

The gate driver 331 is disposed, e.g., mounted, on the array substrate 310 in amorphous silicon thin film transistor ("TFT") gate driver circuit form. The gate driver 331 generates the gate signals in response to a gate control signal provided from a timing controller (not shown) mounted on the driving circuit board 334. The gate signals are sequentially applied to the pixels in the unit of row.

The source driving chips 332 are disposed, e.g., mounted, on the flexible printed circuit boards 333 and connected between the driving circuit board 334 and a lower portion of the array substrate 310. In one exemplary embodiment, for example, the source driving chips 332 are mounted on the flexible printed circuit boards 333 by a tape carrier package scheme. In an alternative exemplary embodiment, the source driving chips 332 may be mounted on the array substrate 310 by a chip-on-glass scheme.

The source driving chips 332 receive image signals and a data control signal from the timing controller mounted on the driving circuit board 334. The source driving chips 332 generate analog data voltages corresponding to the image signals in response to the data control signal, and the data voltages are applied to the pixels.

The backlight unit 400 is disposed at a rear side of the display panel 300 to supply the light to the display panel 300. As described above, the image is displayed by the transmittance of the light traveling to the display panel 300.

The liquid crystal lens panel 100 includes the driving ICs D_IC. Each driving IC D_IC is connected to a corresponding data pad of the data pads DPD. The driving ICs D_IC apply the lens driving voltages to the first electrodes E1_1 to E1_n and the common voltage to the first common electrode CE1 through the data pads DPD. The other features of the liquid crystal lens panel 100 are substantially the same as the liquid crystal lens panel 100 shown in FIG. 1 except for the cutting area CA.

The liquid crystal lens panel 100 operates in the two-dimensional mode or the three-dimensional mode. In one exemplary embodiment, for example, when the display device 500 displays the two-dimensional image, the liquid crystal driving voltages are not applied to the liquid crystal lens panel 100. The liquid crystal lens panel 100 transmits the light provided from the display panel 300 without refraction. Therefore, the viewer perceives the two-dimensional image.

When the display device 500 displays the three-dimensional image, the liquid crystal driving voltages are applied to the liquid crystal lens panel 100. The liquid crystal lens panel 100 operates as the Fresnel lens to refract the light provided from the display panel 300. Therefore, the viewer perceives the three-dimensional image.

Figure 10:
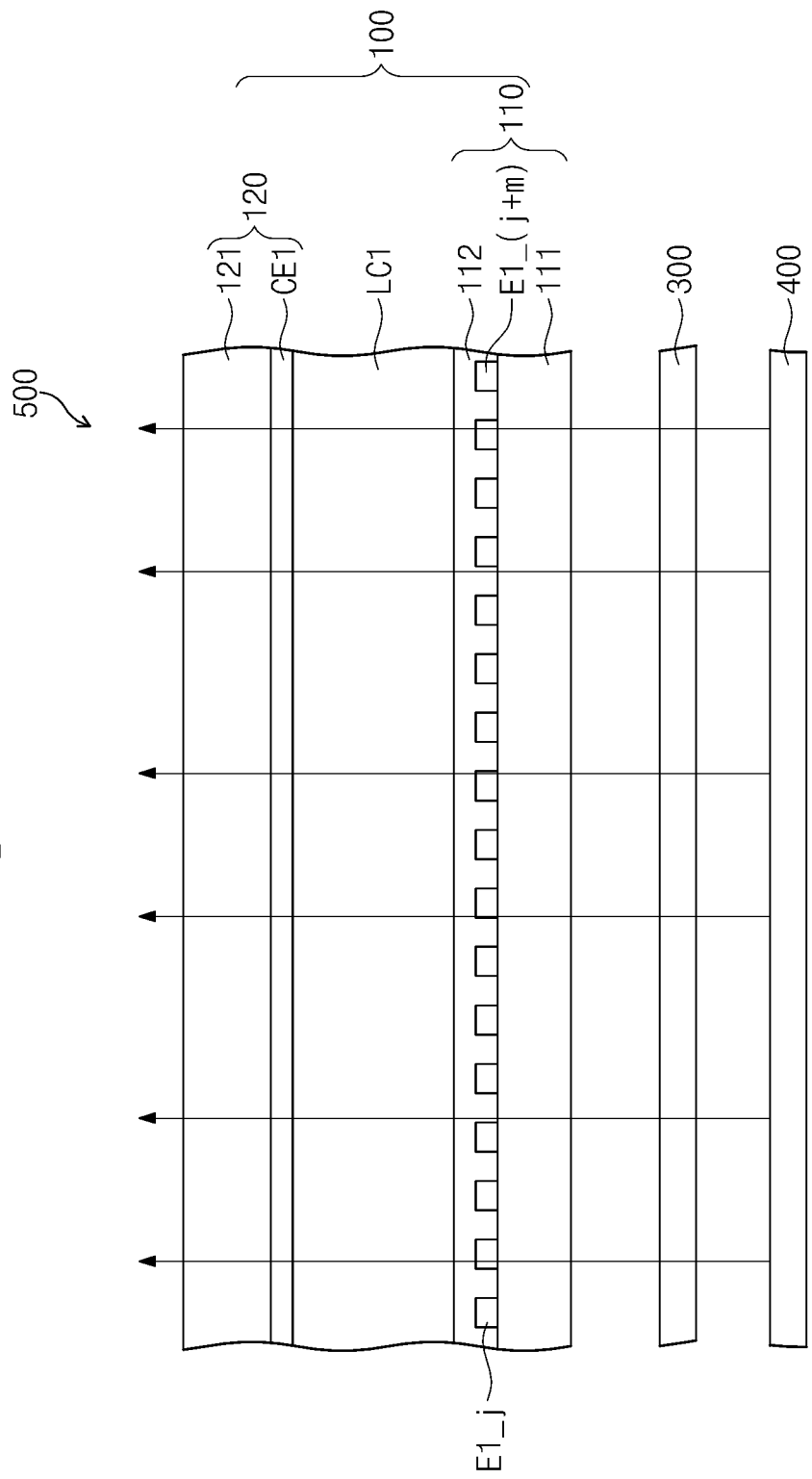
FIGS. 10 and 11 are cross-sectional views showing light refracted by a liquid crystal lens of the liquid crystal lens panel of the display device shown in FIG. 9.
Figure 11:
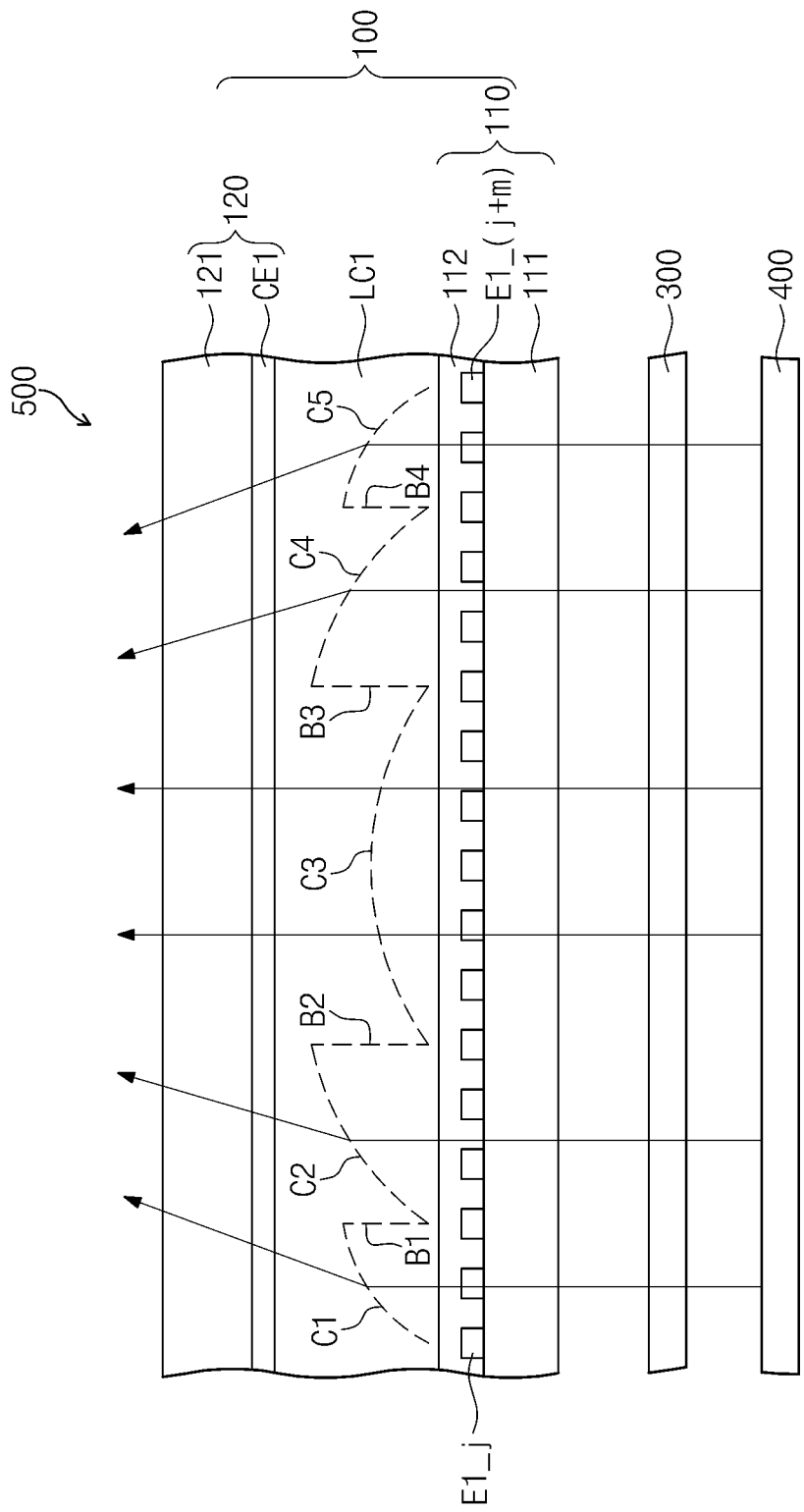

FIGS. 10 and 11 are cross-sectional views showing light refracted by a liquid crystal lens of the liquid crystal lens panel of the display device shown in FIG. 9.

FIG. 10 shows the refraction of the light passing through the liquid crystal lens panel 100 of the display device 500 operated in the two-dimensional mode. FIG. 11 shows the refraction of the light passing through the liquid crystal lens panel 100 of the display device 500 operated in the three-dimensional mode.

In FIGS. 10 and 11, an exemplary embodiment of the display device manufactured using the liquid crystal lens panel 100 shown in FIG. 1 has been shown, but not being limited thereto or thereby. In an alternative exemplary embodiment, the display device 500 may be manufactured using the liquid crystal lens panel 200 shown in FIG. 3 and may be operated in substantially the same way.

Referring to FIGS. 10 and 11, the liquid crystal lens panel 100 is operated in the two-dimensional mode or the three-dimensional mode. In one exemplary embodiment, for example, when the display device 500 displays the two-dimensional image, the liquid crystal driving voltages are not applied to the liquid crystal lens panel 100, such that the liquid crystal lens panel 100 transmits the light provided from the display panel 300 without refraction as shown in FIG. 10. Therefore, the viewer perceives the two-dimensional image.

When the display device 500 is operated in the three-dimensional mode, the liquid crystal lens voltages are applied to the first electrodes $E1\_j$ to $E1\_(j+m)$ and the common voltage is applied to the first common electrode CE1.

The first electrodes $E1\_j$ to $E1\_(j+m)$ are applied with the voltages continuously varied as the liquid crystal driving voltages and voltages, e.g., zero (0) volt, discontinuously varied between the continuously-varied voltages.

The liquid crystal molecules of the first liquid crystal layer LC1 are realigned by the electric field generated between the first common electrode CE1 and the first electrodes $E1\_j$ to $E1\_(j+m)$, and thus a light path distribution corresponding to the Fresnel lens is formed as indicated by a dotted-line of FIG. 11, such that the liquid crystal lens panel 100 is operated as the Fresnel lens. A plurality of Fresnel lenses may be formed in the lens area LA of the liquid crystal lens panel 100 operated in the three-dimensional mode.

In one exemplary embodiment, for example, the areas corresponding to the first electrodes $E1\_j$ to $E1\_(j+m)$ applied with the continuously-varied voltages correspond to arcs C1, C2, C3, C4 and C5 of the Fresnel lenses. The areas corresponding to the first electrodes $E1\_j$ to $E1\_(j+m)$ applied with the discontinuously-varied voltages correspond to boundary areas B1, B2, B3, and B4 between the arcs C1, C2, C3, C4 and C5 of the Fresnel lenses.

The liquid crystal lens panel 100 operated as the Fresnel lens refracts the light provided from the display panel 300 as a Fresnel lens. Thus, the viewer perceives the three-dimensional image.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A method of manufacturing a display device, comprising:
   preparing a display panel;
   coating an adhesive member on the display panel;
   attaching a liquid crystal lens panel including a liquid crystal layer to the display panel using the adhesive member;
   applying an electric field to the liquid crystal layer; and
   irradiating an ultraviolet light onto the adhesive member through the liquid crystal lens panel to cure the adhesive member,
   wherein the liquid crystal lens panel comprises:
   a first substrate which includes a lens area, a non-lens area disposed adjacent to the lens area, and a cutting area disposed adjacent to the non-lens area and including a liquid crystal driving part, the non-lens area being interposed between and contiguous to the lens area and the cutting area, the lens area comprising a plurality of electrodes and the non-lens area comprising a plurality of data pads electrically connected to the electrodes and a plurality of first lines respectively connected to the first electrodes through the data pads;
   a second substrate comprising a common electrode and disposed opposite to the first substrate; and
   the liquid crystal layer interposed between the first substrate and the second substrate.

2. The method of claim 1, further comprising:
removing one portion of the non-lens area after the adhesive member is cured.

3. The method of claim 2, further comprising:
connecting a plurality of driving integrated circuits to the data pads to apply lens driving voltages to the electrodes after the one portion is removed.

4. The method of claim 2, wherein one end of each of the first lines is connected to a respective data pad of the data pads and the other end of each of the first lines is aligned with the end of the non-lens area since the one portion of the non-lens area is removed.

5. The method of claim 1, wherein a liquid crystal layer comprises a plurality of liquid crystal molecules,
the liquid crystal molecules are aligned substantially in a vertical direction from a horizontal direction since the electric field is applied to the liquid crystal layer.

6. The method of claim 5, wherein the applying the electric field to the liquid crystal layer comprises applying a first voltage to the electrodes and applying second voltage to the common electrode.

\* \* \* \* \*